(12) United States Patent
Hua et al.

(10) Patent No.: US 11,652,426 B2
(45) Date of Patent: May 16, 2023

(54) COMPOSITE MOTOR HAVING HIGH-PRECISION POSITIONING

(71) Applicant: NANTONG UNIVERSITY, Nantong (CN)

(72) Inventors: Liang Hua, Nantong (CN); Ling Jiang, Nantong (CN); Juping Gu, Nantong (CN); Ping Lu, Nantong (CN); Yuxuan Ge, Nantong (CN); Yisheng Huang, Nantong (CN); Chunkai Yan, Nantong (CN); Wenbo Su, Nantong (CN)

(73) Assignee: NANTONG UNIVERSITY, Nantong (CN)

( * ) Notice: Subject to any disclaimer, the term of this patent is extended or adjusted under 35 U.S.C. 154(b) by 0 days.

(21) Appl. No.: 17/288,561

(22) PCT Filed: Dec. 2, 2020

(86) PCT No.: PCT/CN2020/133295
§ 371 (c)(1),
(2) Date: Apr. 25, 2021

(87) PCT Pub. No.: WO2021/068993
PCT Pub. Date: Apr. 15, 2021

(65) Prior Publication Data
US 2022/0399834 A1  Dec. 15, 2022

(30) Foreign Application Priority Data
Feb. 11, 2020  (CN) .......................... 202010086168.4

(51) Int. Cl.
*H02N 2/14* (2006.01)
*H02N 2/10* (2006.01)
*H02N 2/16* (2006.01)

(52) U.S. Cl.
CPC ............. *H02N 2/142* (2013.01); *H02N 2/101* (2013.01); *H02N 2/163* (2013.01)

(58) Field of Classification Search
CPC ........ H02N 2/142; H02N 2/101; H02N 2/163; H02N 2/123; H02N 2/12; H02K 37/24
See application file for complete search history.

(56) References Cited

U.S. PATENT DOCUMENTS 7,271,523 B2 * 9/2007 Zeigler .................. H02N 2/101
310/323.02

* cited by examiner

*Primary Examiner* — Emily P Pham
(74) *Attorney, Agent, or Firm* — CBM Patent Consulting, LLC

(57) ABSTRACT

A composite motor having high-precision positioning, comprising: a housing (1), a rough positioning assembly, a hollow output shaft (2), a fine positioning assembly, a power switching apparatus and a controller (6). A stepper motor (3) in the rough positioning assembly is responsible for rough positioning of the composite motor, an annular travelling wave ultrasonic motor in the fine positioning assembly is responsible for tail end fine positioning of the composite motor, and the controller (6) implements power output switching between the annular travelling wave ultrasonic motor and the stepper motor (3). The composite motor effectively solves the problem that annular travelling wave ultrasonic motors which operate continuously for a long time have a short service life, and ensures high-precision positioning while also extending motor service life.

4 Claims, 2 Drawing Sheets

COMPOSITE MOTOR HAVING HIGH-PRECISION POSITIONING

TECHNICAL FIELD

The invention relates to the technical field of mechanical design and motor control, in particular to a composite motor having high-precision positioning.

DESCRIPTION OF THE RELATED ART

At this stage, traveling wave ultrasonic motors are widely used in precision positioning instruments. Compared with traditional motors, traveling wave ultrasonic motors have the characteristics of low-speed and large-torque output, low operating noise and large holding torque. The macroscopic performance of large holding torque is the good start-stop control of the motor. And the motion accuracy of the traveling wave ultrasonic motor can reach the nanometer level. Since the traveling wave ultrasonic motor relies on the friction between the stator and the working surface of the rotor to transform into the linear or rotational movement of the rotor, it is not affected by changes in the external electromagnetic field, but the frictional movement will cause the motor to generate more heat so that it cannot be long. Time continuous work, continuous work will greatly reduce the service life of the motor and positioning accuracy. Therefore, it is an urgent problem to find a composite motor that can not only guarantee the positioning accuracy, but also ensure long-term continuous and effective operation.

TECHNICAL ISSUES

The purpose of the present invention is to provide a composite motor having high-precision positioning, which solves the problem that the traditional traveling wave ultrasonic motor cannot run continuously for a long time while ensuring the positioning accuracy.

TECHNICAL SOLUTION

A composite motor capable of high-precision positioning comprises a housing, a first positioning assembly that is used for an approximately position, a hollow output shaft, a second positioning assembly that is used for a precise position after the motor is moved to the approximately position, a power switching device and a controller.

The first positioning assembly comprises a stepper motor and a first hollow rotating shaft, wherein the stepper motor is fixedly arranged at a bottom of the housing, the first hollow rotating shaft is vertically arranged on the stepper motor, and one end of the first hollow rotating shaft is connected with an output shaft of the stepper motor. The stepper motor is used to drive the first hollow rotating shaft to rotate.

The hollow output shaft is rotatably connected to a periphery of the first hollow rotating shaft through a first bearing assembly. The first bearing assembly comprises at least one bearing.

The second positioning assembly comprises an annular traveling wave ultrasonic motor and a second hollow rotating shaft, wherein the annular traveling wave ultrasonic motor is used for driving the second hollow rotating shaft to rotate, and the annular traveling wave ultrasonic motor comprises a rotor and a stator. The second hollow rotating shaft is rotatably connected to a periphery of the hollow output shaft through a second bearing assembly, and the second bearing assembly comprises at least one bearing. The rotor is arranged outside a bottom edge of the second hollow rotating shaft, and the stator is arranged at a position, matched with the rotor, of the bottom of the housing.

The power switching device comprises at least two connection and conversion assemblies. The connection and conversion assembly comprises a metal connection shaft, a first electromagnetic connection mechanism and a second electromagnetic connection mechanism. The metal connection shaft horizontally penetrates through a through hole formed in a side wall of the hollow output shaft. The first electromagnetic connection mechanism comprises a first fixing slot formed in a side wall of the first hollow rotating shaft in a penetrating mode and a first electromagnet arranged at a bottom of the first fixing slot, and a first laser range sensor is embedded in the first electromagnet. The second electromagnetic connection mechanism comprises a second fixing slot formed in a side wall of the second hollow rotating shaft in a penetrating mode and a second electromagnet arranged at a bottom of the second fixing slot, and a second laser range sensor is embedded in the second electromagnet. The first fixing slot and the second fixing slot are respectively matched with both ends of the metal connection shaft, so that by energizing the first electromagnet or the second electromagnet, the metal connection shaft can horizontally slide to one end to engage with the first fixing slot under the attraction of the first electromagnet to allow the first hollow rotating shaft to drive the hollow output shaft, or horizontally slide to one end to engage with the second fixing slot under the attraction of the second electromagnet to allow the second hollow rotating shaft to drive the hollow output shaft.

If the difference between the inner diameter of the first hollow rotating shaft and the outer diameter of the hollow output shaft is n, the difference between the inner diameter of the second hollow rotating shaft and the inner diameter of the first hollow rotating shaft is m, and the length of the metal connection shaft is x, then x must satisfy: $n \leq x < m$.

The housing, the hollow output shaft, the first hollow rotating shaft and the second hollow rotating shaft are all hollow cylinders;

The controller is in signal connection with the stepping motor, the annular traveling wave ultrasonic motor, the first laser range sensor, and the second laser range sensor;

When the composite motor is in a first positioning working state, the first electromagnet 1 is energized, one end of the metal connection shaft is embedded into the first fixing slot under the attraction of the first electromagnet, and the stepper motor is in a working state, and drives, through the output shaft, the first hollow rotating shaft to rotate to complete first positioning.

When the composite motor is in a second positioning working state, the second electromagnet is energized, one end of the metal connection shaft is embedded into the second fixing slot under the attraction of the second electromagnet, and the annular traveling wave ultrasonic motor is in a working state, and drives the second hollow rotating shaft to rotate through the coordinated movement of the rotor and the stator to complete second positioning.

When the composite motor is used for long-stroke positioning, it is necessary to repeat the switching from first positioning to second positioning and from second positioning to first positioning, and the switching action is controlled and executed by the controller. When the controller receives an external input switching signal (the switching signal can also come from program setting), firstly, a current power source of the hollow output shaft of the composite motor is judged; if the power source is the stepper motor, the stepper motor is controlled to reduce the rotation speed of the first hollow rotating shaft to 2 r/min; when the second laser range sensor detects the metal connection shaft, the controller immediately controls the stepper motor to stop working so that the first hollow rotating shaft stops rotating, and at the same time the first electromagnet is controlled to be powered off; the second electromagnet is in an energized state, under the strong attraction force of the second electromagnet, one end of the metal connection shaft is separated from the first fixing slot, the other end of the metal connection shaft is embedded in the second fixing slot, and an end face is closely attached to the second electromagnet; and when the second laser range sensor detects that a tail end of the metal connection shaft moves to be completely embedded in the first fixing slot, a signal is sent to the controller, and the controller controls the annular traveling wave ultrasonic motor to work according to the received signal, thereby driving the second hollow rotating shaft to rotate, so as to realize the switching from first positioning to second positioning of the composite motor. If the power source of the hollow output shaft is the annular traveling wave ultrasonic motor, the annular traveling wave ultrasonic motor is controlled to reduce the rotation speed of the second hollow rotating shaft to 2 r/min; when the first laser range sensor detects the metal connection shaft, the controller immediately controls the annular traveling wave ultrasonic motor to stop working so that the second hollow rotating shaft stops rotating, and at the same time the second electromagnet is controlled to be powered off; the first electromagnet is in an energized state, under the strong attraction force of the first electromagnet, one end of the metal connection shaft is separated from the second fixing slot, the other end of the metal connection shaft is embedded in the first fixing slot, and the end face is closely attached to the first electromagnet; and when the first laser range sensor detects that the tail end of the metal connection shaft moves to be completely embedded in the first fixing slot, a signal is sent to the controller, and the controller controls the stepper motor to work according to the received signal, thereby driving the first hollow rotating shaft to rotate, so as to realize the switching from second positioning to first positioning of the composite motor.

The power switching device comprises two connection and conversion assemblies which are symmetrically arranged.

The apertures of the notches of the first fixing slot and the second fixing slot are slightly larger than the apertures of the groove bottom.

The length of the metal connection shaft is the difference between the inner diameter of the second hollow rotating shaft and the outer diameter of the first hollow rotating shaft.

Beneficial Effects

The composite motor having high-precision positioning proposed by the present invention is based on the coordinated work of a stepping motor and a annular traveling wave ultrasonic motor, which can realize mutual coordination and positioning between the two motors. In the case of a large-stroke rotation of the motor, the composite motor can rely on the stepping motor Achieve large-stroke fast rotation and complete first positioning of the target positioning position; in the case of motor precision, the composite motor can rely on the annular traveling wave ultrasonic motor to complete the rapid and precise positioning of the target positioning position, and the continuous working time of the annular traveling wave ultrasonic motor is greatly shortened, Which broadens the application scenarios of toroidal traveling wave ultrasonic motors, and provides solutions for large-stroke precise positioning. The composite motor power switching mechanical structure provided by the invention is simple and easy to implement, has good repeatability, and the control circuit has simple control logic and good stability. It has strong adaptability under complex operation conditions.

DESCRIPTION OF SEVERAL VIEWS OF THE ATTACHED DRAWINGS

Figure 1:
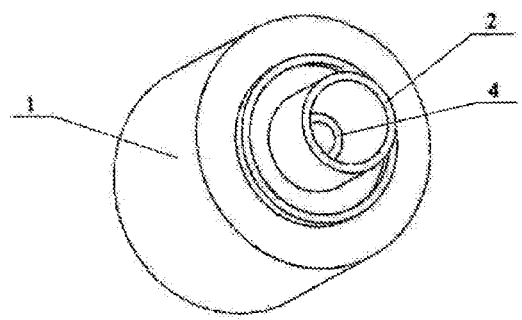
FIG. 1 is a three-dimensional diagram of a composite motor capable of high-precision positioning according to the invention.
Figure 2:
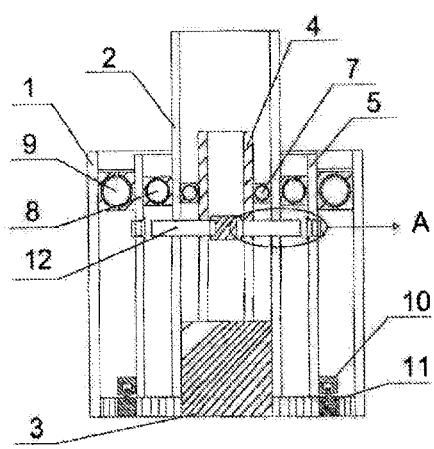
FIG. 2 is a side sectional view of a composite motor capable of high-precision positioning according to the invention.
Figure 3:
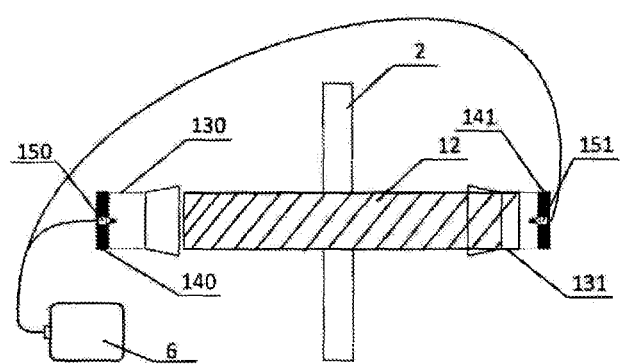
FIG. 3 is an enlarged view of A in FIG. 2.

DESCRIPTION OF REFERENCE NUMERALS 1. housing; 2. hollow output shaft; 3. stepper motor; 4. first hollow rotating shaft; 5. second hollow rotating shaft; 6. controller; 7. first bearing assembly; 8. second bearing assembly; 9. third bearing assembly; 10. rotor; 11. stator; 12. metal connection shaft; 130. first fixing slot; 131. second fixing slot; 140. first electromagnet; 141. second electromagnet; 150. first laser range sensor; 151. second laser range sensor.

DETAILED DESCRIPTION OF THE INVENTION

A composite motor capable of high-precision positioning comprises a housing 1, a first positioning assembly, a hollow output shaft 2, a second positioning assembly, a power switching device and a controller 6. The first positioning assembly comprises a stepper motor 3 and a first hollow rotating shaft 4, wherein the stepper motor 3 is fixedly arranged at a bottom of the housing 1, the first hollow rotating shaft 4 is vertically arranged on the stepper motor 3, and one end of the the first hollow rotating shaft 4 is connected with an output shaft of the stepper motor 3. The stepper motor 3 is used to drive the first hollow rotating shaft 4 to rotate. The hollow output shaft 2 is rotatably connected to a periphery of the first hollow rotating shaft 4 through a first bearing assembly 7. The first bearing assembly 7 comprises at least one bearing. The second positioning assembly comprises an annular traveling wave ultrasonic motor and a second hollow rotating shaft 5, wherein the annular traveling wave ultrasonic motor is used for driving the second hollow rotating shaft 5 to rotate, and the annular traveling wave ultrasonic motor comprises a rotor 10 and a stator 11. The second hollow rotating shaft 5 is rotatably connected to a periphery of the hollow output shaft 2 through a second bearing assembly 8, and the second bearing assembly 8 comprises at least one bearing. The rotor 10 is arranged outside a bottom edge of the second hollow rotating shaft 5, and the stator 11 is arranged at a position, matched with the rotor 10, of the bottom of the housing 1. The power switching device comprises at least two connection and conversion assemblies. The connection and conversion assembly comprises a metal connection shaft 12, a first electromagnetic connection mechanism and a second electromagnetic connection mechanism. The metal connection shaft 12 horizontally penetrates through a through hole formed in a side wall of the hollow output shaft 2. The first electromagnetic connection mechanism comprises a first fixing slot 130 formed in a side wall of the first hollow rotating shaft 4 in a penetrating mode and a first electromagnet 140 arranged at a bottom of the first fixing slot 130, and a first laser range sensor 150 is embedded in the first electromagnet 140. The second electromagnetic connection mechanism comprises a second fixing slot 131 formed in a side wall of the second hollow rotating shaft 5 in a penetrating mode and a second electromagnet 141 arranged at a bottom of the second fixing slot 131, and a second laser range sensor 151 is embedded in the second electromagnet 141. The first fixing slot 130 and the second fixing slot 131 are respectively matched with both ends of the metal connection shaft 12, so that by energizing the first electromagnet 140 or the second electromagnet 141, the metal connection shaft 12 can horizontally slide to one end to engage with the first fixing slot 130 under the attraction of the first electromagnet 140 to allow the first hollow rotating shaft 4 to drive the hollow output shaft 2, or horizontally slide to one end to engage with the second fixing slot 131 under the attraction of the second electromagnet 141 to allow the second hollow rotating shaft 5 to drive the hollow output shaft 2. To achieve this goal, there are certain requirements for the length relationship of the metal connection shaft 12. If the difference between the inner diameter of the first hollow rotating shaft 4 and the outer diameter of the hollow output shaft 2 is n, the difference between the inner diameter of the second hollow rotating shaft 5 and the inner diameter of the first hollow rotating shaft 4 is m, and the length of the metal connection shaft 12 is x, then x must satisfy: $n \leq x < m$.

The housing 1, the hollow output shaft 2, the first hollow rotating shaft 4 and the second hollow rotating shaft 5 are all hollow cylinders. The controller 6 is in signal connection with the stepper motor 3, the annular traveling wave ultrasonic motor, the first electromagnet 140, the second electromagnet 141, the first laser range sensor 150 and the second laser range sensor 151.

A third bearing assembly 9 is also provided, which is arranged between an outer wall of the second hollow rotating shaft 5 and an inner wall of the housing 1. The third bearing assembly 9 comprises at least one bearing, and plays a supporting role to make the rotation of the second hollow rotating shaft 5 more stable.

The power switching device comprises two connection and conversion assemblies which are symmetrically arranged, so as to ensure that the power transmission of the first positioning assembly or the second positioning assembly to the hollow output shaft 2 is balanced and stable.

The shapes of inner slotted holes of the first fixing slot 130 and the second fixing slot 131 are the same as the shapes of both ends of the metal connection shaft 12, and the aperture of a slot opening is slightly larger than that of the inner slotted hole, so that the metal connection shaft 12 can be quickly and accurately embedded into the first fixing slot 130 or the second fixing slot 131 for engagement.

When the composite motor is in a first positioning working state, the first electromagnet 140 is energized, one end of the metal connection shaft 12 is embedded into the first fixing slot 130 under the attraction of the first electromagnet 140, and the stepper motor 3 is in a working state, and drives, through the output shaft, the first hollow rotating shaft 4 to rotate to complete first positioning.

When the composite motor is in a second positioning working state, the second electromagnet 141 is energized, one end of the metal connection shaft 12 is embedded into the second fixing slot 131 under the attraction of the second electromagnet 141, and the annular traveling wave ultrasonic motor is in a working state, and drives the second hollow rotating shaft 5 to rotate through the coordinated movement of the rotor 10 and the stator 11 to complete second positioning.

When the composite motor is used for long-stroke positioning, it is necessary to repeat the switching from first positioning to second positioning and from second positioning to first positioning, and the switching action is controlled and executed by the controller 6. When the controller 6 receives an external input switching signal (the switching signal can also come from program setting), firstly, a current power source of the hollow output shaft 2 of the composite motor is judged; if the power source is the stepper motor 3, the stepper motor 3 is controlled to reduce the rotation speed of the first hollow rotating shaft 4 to 2 r/min; when the second laser range sensor 151 detects the metal connection shaft 12, the controller 6 immediately controls the stepper motor 3 to stop working so that the first hollow rotating shaft 4 stops rotating, and at the same time the first electromagnet 140 is controlled to be powered off; the second electromagnet 141 is in an energized state, under the strong attraction force of the second electromagnet 141, one end of the metal connection shaft 12 is separated from the first fixing slot 130, the other end of the metal connection shaft 12 is embedded in the second fixing slot 131, and an end face is closely attached to the second electromagnet 141; and when the second laser range sensor 151 detects that a tail end of the metal connection shaft 12 moves to be completely embedded in the first fixing slot 131, a signal is sent to the controller 6, and the controller 6 controls the annular traveling wave ultrasonic motor to work according to the received signal, thereby driving the second hollow rotating shaft 5 to rotate, so as to realize the switching from first positioning to second positioning of the composite motor. If the power source of the hollow output shaft 2 is the annular traveling wave ultrasonic motor, the annular traveling wave ultrasonic motor is controlled to reduce the rotation speed of the second hollow rotating shaft 5 to 2 r/min; when the first laser range sensor 150 detects the metal connection shaft 12, the controller 6 immediately controls the annular traveling wave ultrasonic motor to stop working so that the second hollow rotating shaft 5 stops rotating, and at the same time the second electromagnet 141 is controlled to be powered off; the first electromagnet 140 is in an energized state, under the strong attraction force of the first electromagnet 140, one end of the metal connection shaft 12 is separated from the second fixing slot 131, the other end of the metal connection shaft 12 is embedded in the first fixing slot 130, and the end face is closely attached to the first electromagnet 140; and when the first laser range sensor 150 detects that the tail end of the metal connection shaft 12 moves to be completely embedded in the first fixing slot 130, a signal is sent to the controller 6, and the controller 6 controls the stepper motor 3 to work according to the received signal, thereby driving the first hollow rotating shaft 4 to rotate, so as to realize the switching from second positioning to first positioning of the composite motor.

What is claimed is:
1. A composite motor having high-precision positioning comprising:
   a housing, a first positioning assembly, a hollow output shaft, a second positioning assembly, a power switching device and a controller;
   the first positioning assembly comprises a stepper motor and a first hollow rotating shaft, wherein the stepper motor is fixedly arranged at a bottom of the housing, the first hollow rotating shaft is vertically arranged on the stepper motor, and one end of the first hollow rotating shaft is connected with an output shaft of the stepper motor; the stepper motor is used to drive the first hollow rotating shaft to rotate;

the hollow output shaft is rotatably connected to a periphery of the first hollow rotating shaft through a first bearing assembly; the first bearing assembly comprises at least one bearing;

the second positioning assembly comprises an annular traveling wave ultrasonic motor and a second hollow rotating shaft, wherein the annular traveling wave ultrasonic motor is used for driving the second hollow rotating shaft to rotate, and the annular traveling wave ultrasonic motor comprises a rotor and a stator; the second hollow rotating shaft is rotatably connected to a periphery of the hollow output shaft through a second bearing assembly, and the second bearing assembly comprises at least one bearing; the rotor is arranged outside a bottom edge of the second hollow rotating shaft, and the stator is arranged at a position, matched with the rotor, of the bottom of the housing;

the power switching device comprises at least two connection and conversion assemblies; the connection and conversion assembly comprises a metal connection shaft, a first electromagnetic connection mechanism and a second electromagnetic connection mechanism; the metal connection shaft horizontally penetrates through a through hole formed in a side wall of the hollow output shaft; the first electromagnetic connection mechanism comprises a first fixing slot formed in a side wall of the first hollow rotating shaft in a penetrating mode and a first electromagnet arranged at a bottom of the first fixing slot, and a first laser range sensor is embedded in the first electromagnet; the second electromagnetic connection mechanism comprises a second fixing slot formed in a side wall of the second hollow rotating shaft in a penetrating mode and a second electromagnet arranged at a bottom of the second fixing slot, and a second laser range sensor is embedded in the second electromagnet; the first fixing slot and the second fixing slot are respectively matched with both ends of the metal connection shaft, so that by energizing the first electromagnet or the second electromagnet, the metal connection shaft can horizontally slide to one end to engage with the first fixing slot under the attraction of the first electromagnet to allow the first hollow rotating shaft to drive the hollow output shaft, or horizontally slide to one end to engage with the second fixing slot under the attraction of the second electromagnet to allow the second hollow rotating shaft to drive the hollow output shaft;

if the difference between the inner diameter of the first hollow rotating shaft and the outer diameter of the hollow output shaft is n, the difference between the inner diameter of the second hollow rotating shaft and the inner diameter of the first hollow rotating shaft is m, and the length of the metal connection shaft is x, then x must satisfy: $n \leq x < m$;

the housing, the hollow output shaft, the first hollow rotating shaft and the second hollow rotating shaft are all hollow cylinders;

the controller is in signal connection with the stepper motor, the annular traveling wave ultrasonic motor, the first laser range sensor, and the second laser range sensor;

when the composite motor is in a first positioning working state, the first electromagnet is energized, one end of the metal connection shaft is embedded into the first fixing slot under the attraction of the first electromagnet, and the stepper motor is in a working state, and drives, through the output shaft, the first hollow rotating shaft to rotate to complete first positioning;

when the composite motor is in a second positioning working state, the second electromagnet is energized, one end of the metal connection shaft is embedded into the second fixing slot under the attraction of the second electromagnet, and the annular traveling wave ultrasonic motor is in a working state, and drives the second hollow rotating shaft to rotate through the coordinated movement of the rotor and the stator to complete second positioning;

when the composite motor is used for long-stroke positioning, it is necessary to repeat the switching from first positioning to second positioning and from second positioning to first positioning, and the switching action is controlled and executed by the controller; when the controller receives an external input switching signal, firstly, a current power source of the hollow output shaft of the composite motor is judged; if the power source is the stepper motor, the stepper motor is controlled to reduce the rotation speed of the first hollow rotating shaft to 2 r/min; when the second laser range sensor detects the metal connection shaft, the controller immediately controls the stepper motor to stop working so that the first hollow rotating shaft stops rotating, and at the same time the first electromagnet is controlled to be powered off; the second electromagnet is in an energized state, under the strong attraction force of the second electromagnet, one end of the metal connection shaft is separated from the first fixing slot, the other end of the metal connection shaft is embedded in the second fixing slot, and an end face is closely attached to the second electromagnet; and when the second laser range sensor detects that a tail end of the metal connection shaft moves to be completely embedded in the first fixing slot, a signal is sent to the controller, and the controller controls the annular traveling wave ultrasonic motor to work according to the received signal, thereby driving the second hollow rotating shaft to rotate, so as to realize the switching from first positioning to second positioning of the composite motor; if the power source of the hollow output shaft is the annular traveling wave ultrasonic motor, the annular traveling wave ultrasonic motor is controlled to reduce the rotation speed of the second hollow rotating shaft to 2 r/min; when the first laser range sensor detects the metal connection shaft, the controller immediately controls the annular traveling wave ultrasonic motor to stop working so that the second hollow rotating shaft stops rotating, and at the same time the second electromagnet is controlled to be powered off; the first electromagnet is in an energized state, under the strong attraction force of the first electromagnet, one end of the metal connection shaft is separated from the second fixing slot, the other end of the metal connection shaft is embedded in the first fixing slot, and the end face is closely attached to the first electromagnet; and when the first laser range sensor detects that the tail end of the metal connection shaft moves to be completely embedded in the first fixing slot, a signal is sent to the controller, and the controller controls the stepper motor to work according to the received signal, thereby driving the first hollow rotating shaft to rotate, so as to realize the switching from second positioning to first positioning of the composite motor.

2. The composite motor having high-precision positioning according to claim 1, wherein the power switching device comprises two connection and conversion assemblies which are symmetrically arranged.

3. The composite motor having high-precision positioning according to claim 1, wherein the apertures of the notches of the first fixing slot and the second fixing slot are slightly larger than the apertures of the groove bottom.

4. The composite motor having high-precision positioning according to claim 1, wherein the length of the metal connection shaft is the difference between the inner diameter of the second hollow rotating shaft and the outer diameter of the first hollow rotating shaft.

* * * * *